Figure 1:
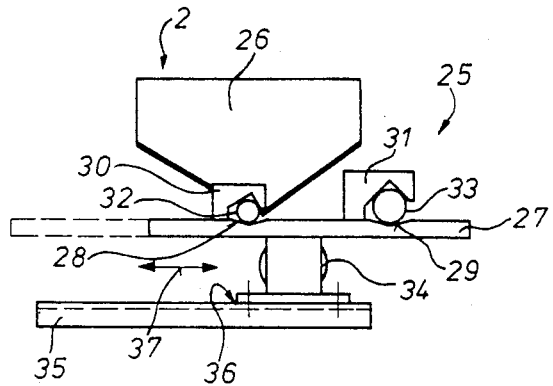

United States Patent [19]

Sticht

[11] Patent Number: 4,651,868
[45] Date of Patent: Mar. 24, 1987

[54] VIBRATORY CONVEYOR

[75] Inventor: Walter Sticht, Attnang-Puchheim, Austria

[73] Assignee: STIWA-Fertigungstechnik Sticht Gesellschaft m.b.H., Attnang-Puchheim, Austria

[21] Appl. No.: 840,995

[22] Filed: Mar. 17, 1986

Related U.S. Application Data

[60] Division of Ser. No. 724,908, Mar. 19, 1985, abandoned, which is a continuation of Ser. No. 470,916, Mar. 1, 1983, abandoned.

[30] Foreign Application Priority Data

Jan. 17, 1983 [AT] Austria .................................. 126/83

[51] Int. Cl.⁴ .............................................. B65G 37/00
[52] U.S. Cl. .................................. 198/540; 198/550.2; 198/570; 198/582; 198/615; 221/241; 222/278
[58] Field of Search .............. 198/359, 366, 369, 445, 198/446, 540, 550.2, 570, 582, 615; 221/241; 222/278, 279, 288

[56] References Cited

U.S. PATENT DOCUMENTS

| | | | |
|---|---|---|---|
| 3,114,448 | 12/1963 | Boris | 198/391 |
| 3,150,762 | 9/1964 | Tricinci | 198/391 X |
| 3,414,111 | 12/1968 | Ernest | 198/391 |
| 3,939,966 | 2/1976 | Szenczy | 198/391 |
| 4,063,642 | 12/1977 | Sticht et al. | 221/160 X |
| 4,301,958 | 11/1981 | Hatakenaka et al. | 198/369 X |

FOREIGN PATENT DOCUMENTS

| | | | |
|---|---|---|---|
| 66418 | 5/1980 | Japan | 198/446 |
| 135023 | 10/1980 | Japan | 198/391 |

Primary Examiner—Jeffrey V. Nase
Attorney, Agent, or Firm—Kurt Kelman

[57] ABSTRACT

A conveyor arrangement for assembly parts comprises a rectilinear vibratory conveyor track comprising two conveyor track parts constituting guide members for the assembly parts, a device for feeding the assembly parts to the conveyor track, a base plate separate from the feeding device and supporting the rectilinear conveyor track, vibrating drive mounting the conveyor track on the base plate, and the guide members being adjustably displaceable in relation to the base plate.

3 Claims, 2 Drawing Figures

U.S. Patent   Mar. 24, 1987   4,651,868

VIBRATORY CONVEYOR

This is a division of my copending U.S. patent application Ser. No. 724,908, filed Mar. 19, 1985 and now abandoned, which is a continuation of my application Ser. No. 470,916, filed Mar. 1, 1983, now abandoned.

The present invention relates to a vibratory conveyor for conveying assembly parts in a conveying direction and comprising a conveyor track, a drive for vibrating the conveyor track and assembly part handling means on the conveyor track for orienting and/or classifying and/or singling the assembly parts.

Such a vibratory conveyor is disclosed, for example, in U.S. Pat. No. 4,063,642. It comprises a plate oscillated by a vibrating drive and whose upper surface has a saw-tooth cross section to define a series of longitudinally extending grooves along which individual assembly parts may move. By milling these grooves along a predetermined length, a balancing edge is provided for assembly parts which are not entirely supported on the portion of the groove which has not been milled, thus causing these parts to tip over the edge and fall laterally off the plate surface. Furthermore, deflectors are mounted on the plate to engage upwardly projecting portions of assembly parts whereby these parts are either oriented into the correct position or removed from the plate. Such vibratory conveyors have been used with considerable success but the manufacture of the plates with balancing edges and deflectors is very labor-intensive and requires high precision work. Furthermore, they do not readily handle assembly parts having downwardly projecting ends.

In the vibratory conveyor disclosed in Accepted German patent specification No. 1,274,981, the conveyor track is comprised of a grid formed of intersecting rods defining openings therebetween. When the grid is vibrated, assembly parts whose head portion has a diameter exceeding the diameter of a shaft portion will be suspended in the openings by the head portion if the diameter of the openings exceeds that of the shaft portion but is smaller than that of the head portion. Such a vibratory conveyor can be used only for very specifically shaped assembly parts, any change in the respective diameters of the parts requiring a different grid.

It is the primary object of this invention to provide a vibratory conveyor simply and readily adaptable for handling different assembly parts, and whose manufacturing costs are relatively low.

The above and other objects are accomplished according to the invention in a conveyor arrangement for assembly parts, which comprises a rectilinear vibratory conveyor track comprising two conveyor track parts constituting guide members for the assembly parts, and means for feeding the assembly parts to the conveyor track. A base plate separate from the feeding means supports the rectilinear conveyor track, a vibrating drive mounts the conveyor track on the base plate, and adjustment means is provided for displacing the guide members in relation to the base plate.

This arrangement has the advantage that standard base plates may be used and the conveyor track may be readily adapted to differently shaped assembly parts by a suitable adjustment of the conveyor track parts. Therefore, such different assembly parts may be handled by the vibratory conveyor of the present invention with a minimum down-time between the handling of the different parts. At the same time, conveyor tracks according to this invention may be used in different vibratory conveyors for handling different assembly parts. Since such conveyor tracks may be mass-produced in large numbers, relatively cheap standard vibratory conveyors may be used for all types of assembly parts, for which individual conveyors had to be provided heretofore.

Furthermore, this arrangement enables the conveyed assembly parts to be roughly oriented and to remove from the conveyor track any superimposed or entangled parts. At the same time, the displaceable conveyor parts may be quickly adjusted to differently shaped or sized assembly parts. If the carrier plate constituting the conveyor track is inclined to the horizontal, superimposed assembly parts will slide off the plate over the top of the guide member, depending on its height. Any parts which fail to slide off will be removed by a guide member constituting a suitably adjusted deflector. The vertical adjustment of the deflector in relation to the dimension of the parts will also cause incorrectly positioned assembly parts or irregular parts, for instance springs having the wrong diameter, to be removed.

Figure 2:
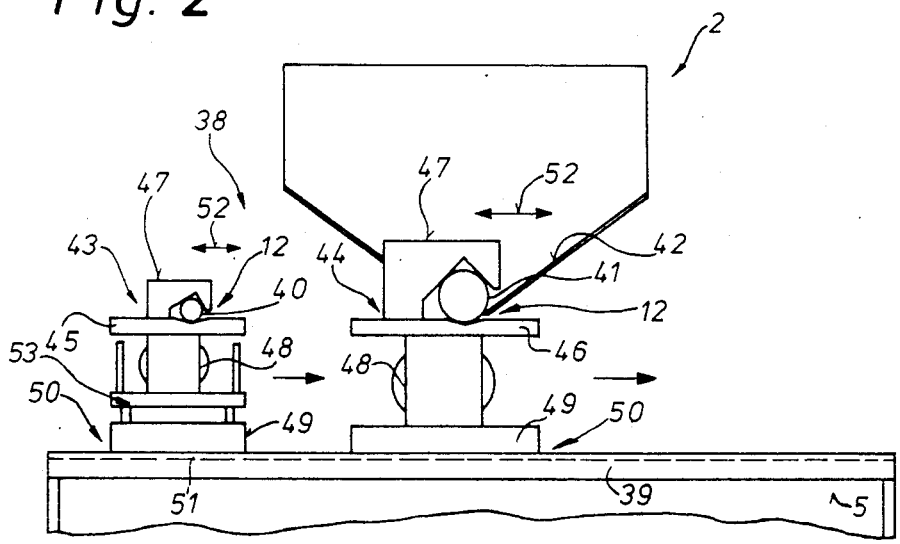

The above and other objects, advantages and features of the invention will become more apparent from the following detailed description of certain now preferred embodiments thereof, taken in conjunction with the accompanying schematic drawing wherein FIG. 1 is an end view of one embodiment of a vibratory conveyor with a carrier plate defining two adjacent, parallel conveyor paths for differently shaped assembly parts; and FIG. 2 is a like view of a further embodiment with two carrier plates defining respective conveyor paths and the carrier plates being transversely displaceable for respective association with the outlet of a feeding means for the assembly parts.

Referring now to the drawing and first to the embodiment of FIG. 1, there is shown vibratory conveyor 25 comprising carrier plate 27 for guide members 30, 31 and adjustment means 36 supports the carrier plate on base plate 35. Carrier plate 27 defines two adjacent, parallel conveyor paths 28, 29 extending in the conveying direction of differently shaped assembly parts 32, 33 and associated with respective guide members 30, 31, each conveyor path and associated guide member being differently shaped for guiding respective differently shaped assembly parts 32, 33. The adjustment means comprises a guide in base plate 35 arranged for displacing carrier plate 27 transversely to the conveying direction. Vibrating drive 34, which supports the carrier plate on the base plate, is mounted on an element glidably arranged in the transverse guide for moving the carrier plate in the directions indicated by double-headed arrow 37 between a position shown in full lines and a position shown in broken lines. The assembly parts are fed to conveyor 25 by means 2 having outlet 26. In this manner, outlet 26 may be selectively associated with a respective conveyor path 28, 29, depending on the transverse displacement of carrier plate 27. The illustrated assembly parts are parts of cylindrical cross section, such as coil springs, the diameter of cylindrical assembly parts 32 being smaller than that of parts 33. In this manner, the conveyor may be readily adjusted for operating with assembly parts of different sizes, guide members 31, 32 serving as guides for orienting the assembly parts in a direction parallel to the conveying direction. Such a conveyor is very economical because a single drive system may be used for handling different parts and the conveyor can be very rapidly adapted to operating with these different parts. This arrangement also enables a longitudinal edge of the carrier plate to be so adjusted in relation to the outlet of the feeding means of the assembly parts that this longitudinal carrier plate edge may function as a balancing edge of unwanted assembly parts which will drop off this edge.

FIG. 2 illustrates vibratory conveyor 38 whose conveyor track comprises two carrier plates 45, 46 defining respective conveyor paths 43, 44 extending in the conveying direction of assembly parts 40, 41 and associated with a respective guide member 47. Similar to the adjustment means in the embodiment of FIG. 1, adjustment means 50 supports the carrier plates in transverse guide 51 of base plate 39 and is arranged for displacing carrier plates 45, 46 transversely to the conveying direction. Also similarly to the embodiment of FIG. 1, the assembly parts are fed to the conveyor by means 2 through outlet 42. Base plate 39 is affixed to housing 5 of conveyor feeding means 2 and sliding elements 49 of adjustment means 50 carry vibrating drives 48 connected to the carrier plates. Illustrated guide members 47 are guides for orienting the assembly parts in the same manner as described hereinabove in connection with FIG. 1 but they could also be guide ledges and/or deflectors. Elements 49 may be displaced along guide 51 manually or by suitable drives in the directions indicated by double-headed arrow 52. In this manner, respective conveyor path 43, 44 may be selectively associated with outlet 42, depending on the transverse displacement of carrier plates 45, 46.

In the illustrated embodiment, carrier plate 45 of conveyor path 43 is also vertically displaceable in relation to base plate 39 by adjustment means 53 schematically illustrated as a carrier of vibrating drive 48 supported on jacks for lifting or lowering the carrier. This enables the conveyor path to be readily adjusted for cooperation with assembly part outlet 42 when vibrating drives and/or assembly parts of different sizes are involved. Such an adjustment is particularly advantageous for use with assembly parts 40, 41 of substantially different dimensions. In this case, a specifically sized oscillatory magnet 48 may be used for each conveyor path carrying these different assembly parts so that optimal conveying conditions prevail in each conveyor path.

The use of the two carrier plates defining the conveyor paths makes it possible rapidly to convert the conveyor for use with different assembly parts simply by displacing the carrier plates selectively to receive the assembly parts from outlet 42. The transverse guides for the carrier plates may be accurately adapted to respective assembly part sizes so that the conversion will proceed rapidly and accurately.

It will be understood by those skilled in the art that any type of means may be used for feeding the assembly parts to the vibratory conveyor, including elevators, chutes or vibratory conveyor pots. The use of the displaceably adjustable conveyor track parts for handling the conveyed assembly parts, i.e. for classifying, or singling or orienting them in one or two directions, has the advantage that they may be arranged in connection with a plane carrier plate for defining the conveyor path for the assembly parts. In this manner, standard carrier plates may be used with a multiplicity of different parts, which is very economical.

I claim:

1. A conveyor arrangement for differently shaped assembly parts, which comprises
  (a) a rectilinear vibratory conveyor track constituted by a carrier plate means for two guide members, the carrier plate means defining two adjacent, parallel conveyor paths associated with the guide members, each conveyor path and associated guide member being differently shaped for guiding respective differently shaped assembly parts,
  (b) a means for feeding the assembly parts to the conveyor track, the feeding means having
    (1) an outlet selectively associated with a respective one of the conveyor paths for feeding the assembly parts to the selected conveyor path,
  (c) a base plate separate from the feeding means and supporting the carrier plate means,
  (d) a vibrating drive means mounting the carrier plate means on the base plate, and
  (e) adjustment means arrangement for displacement of the carrier plate means transversely to the conveyor paths.

2. The conveyor arrangement of claim 1, wherein the carrier plate means is a single carrier plate defining the two conveyor paths.

3. The conveyor arrangement of claim 1, wherein the carrier plate means is constituted by two carrier plates each defining a respective one of the conveyor paths, and the vibrating drive means is constituted by a respective vibrating drive mounting each one of the carrier plates on the base plate.

* * * * *